Aug. 21, 1962  H. F. HEINTZMANN  3,050,004
VALVE GEAR FOR FLUID PRESSURE PUMPS
Filed March 15, 1957  7 Sheets-Sheet 1
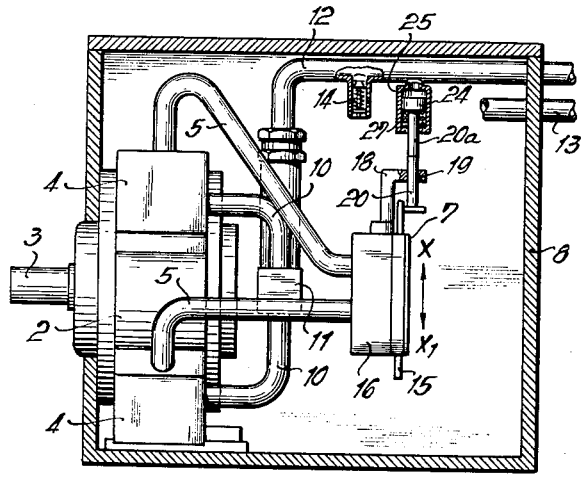
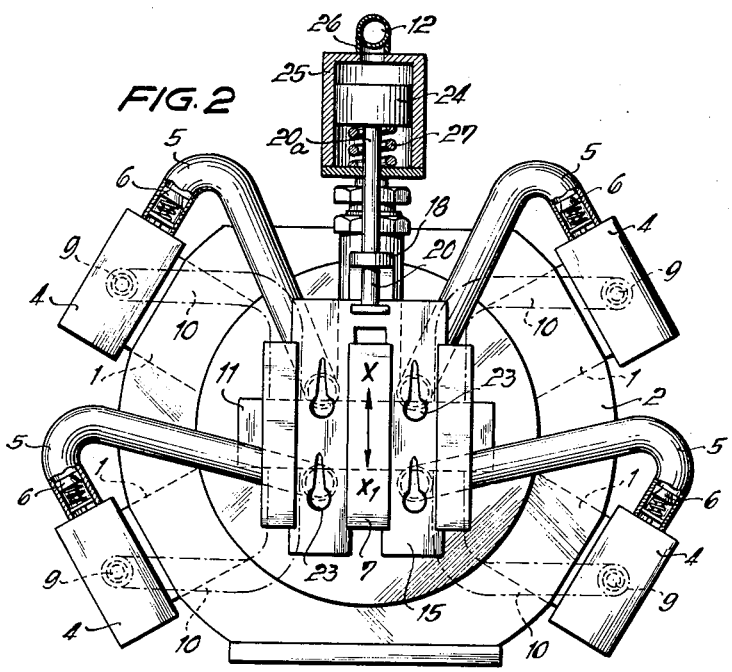
INVENTOR
Hans Friedrich Heintzmann

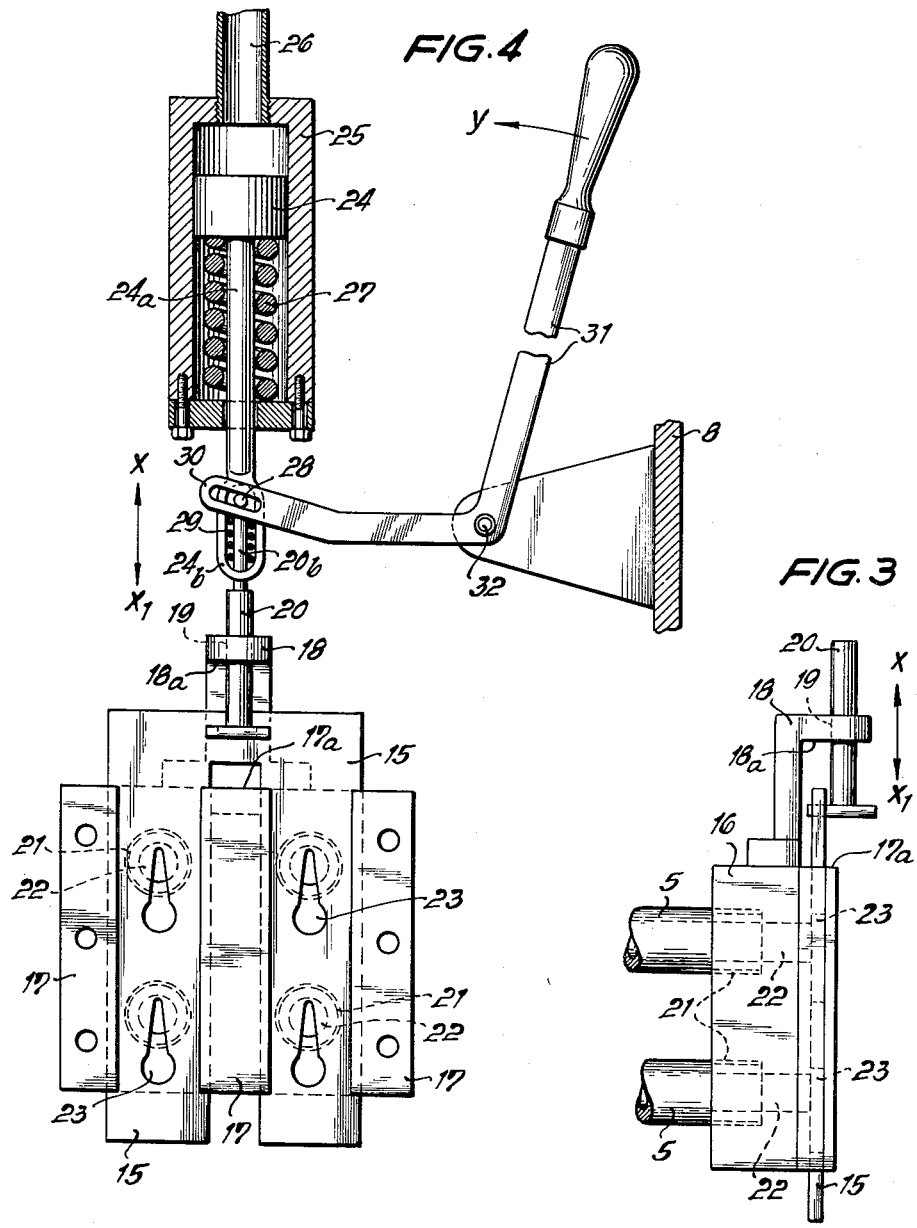

Aug. 21, 1962 H. F. HEINTZMANN 3,050,004
VALVE GEAR FOR FLUID PRESSURE PUMPS
Filed March 15, 1957 7 Sheets-Sheet 3

INVENTOR
Hans Friedrich Heintzmann,
by:
Att'y

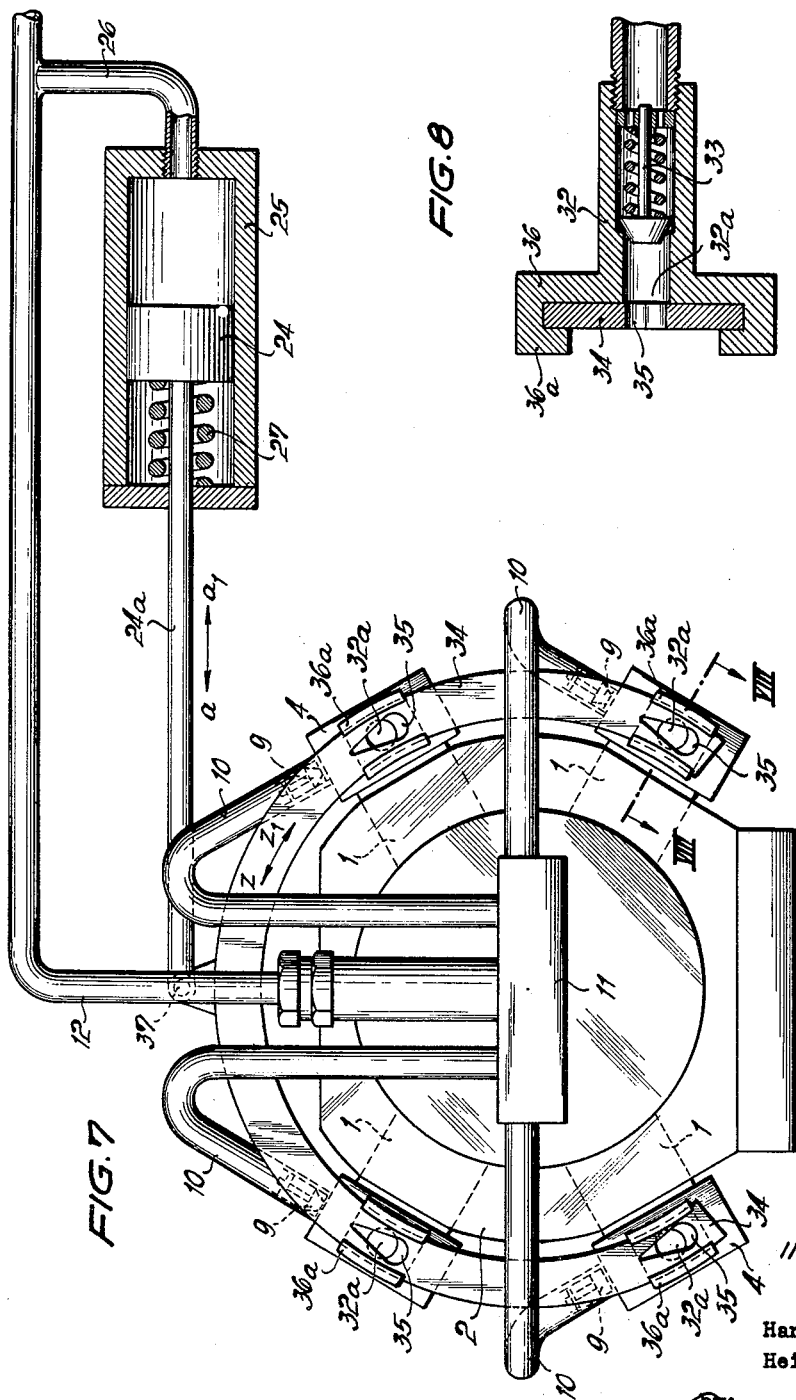

Aug. 21, 1962     H. F. HEINTZMANN     3,050,004
VALVE GEAR FOR FLUID PRESSURE PUMPS
Filed March 15, 1957     7 Sheets-Sheet 5
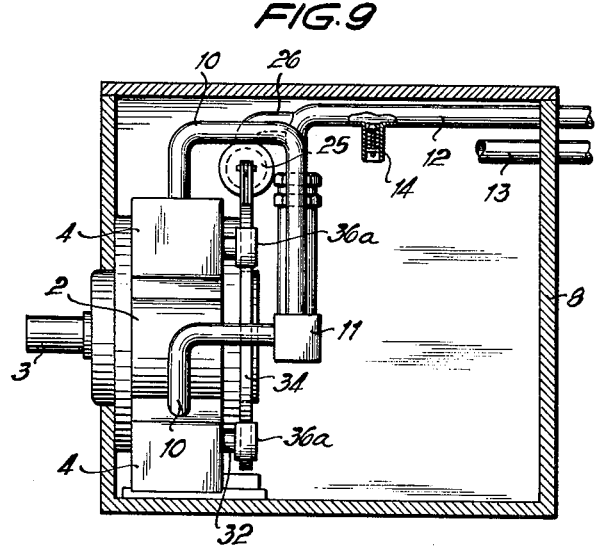
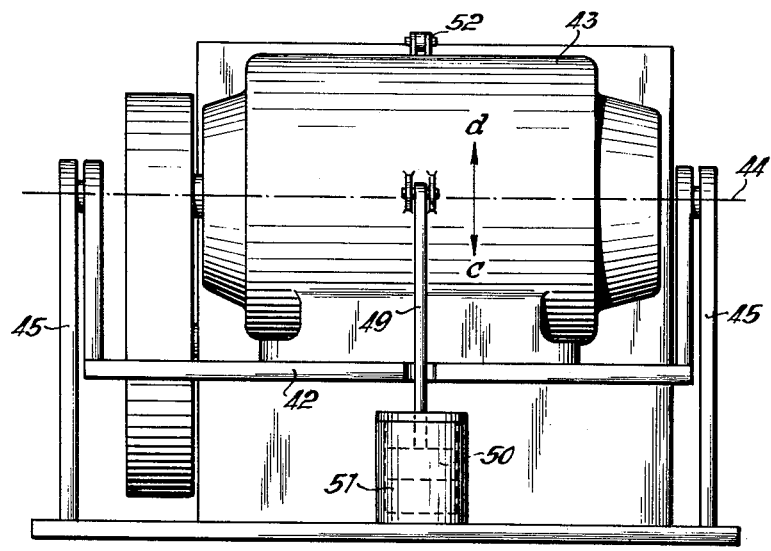
INVENTOR
Hans Friedrich Heintzmann,
by
Att'y

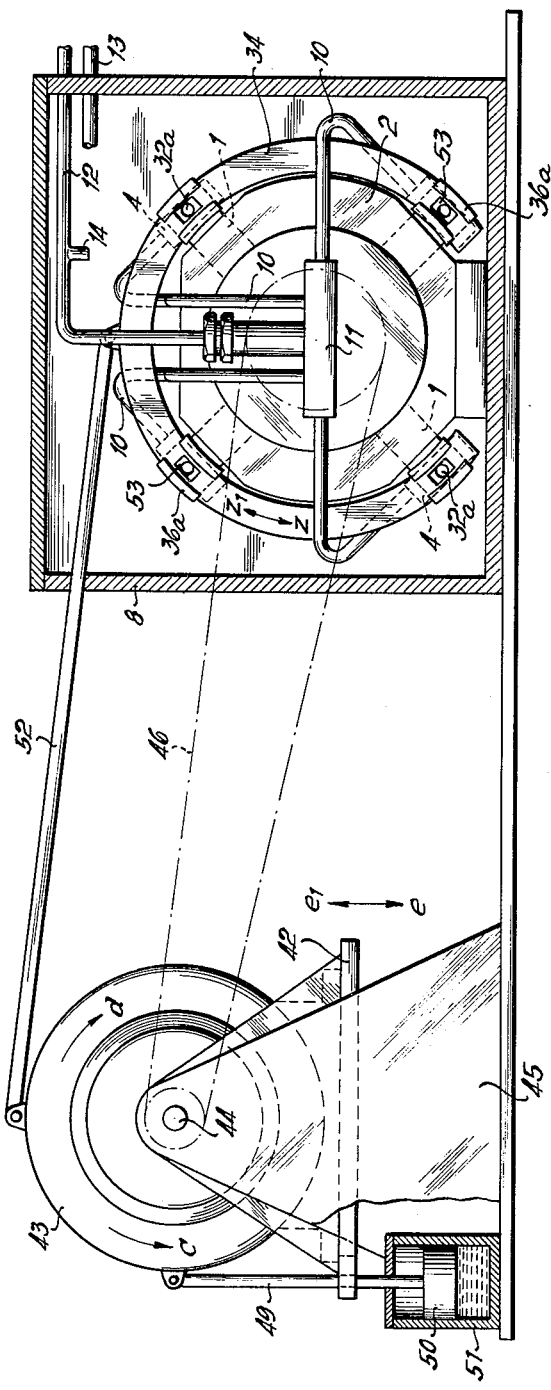

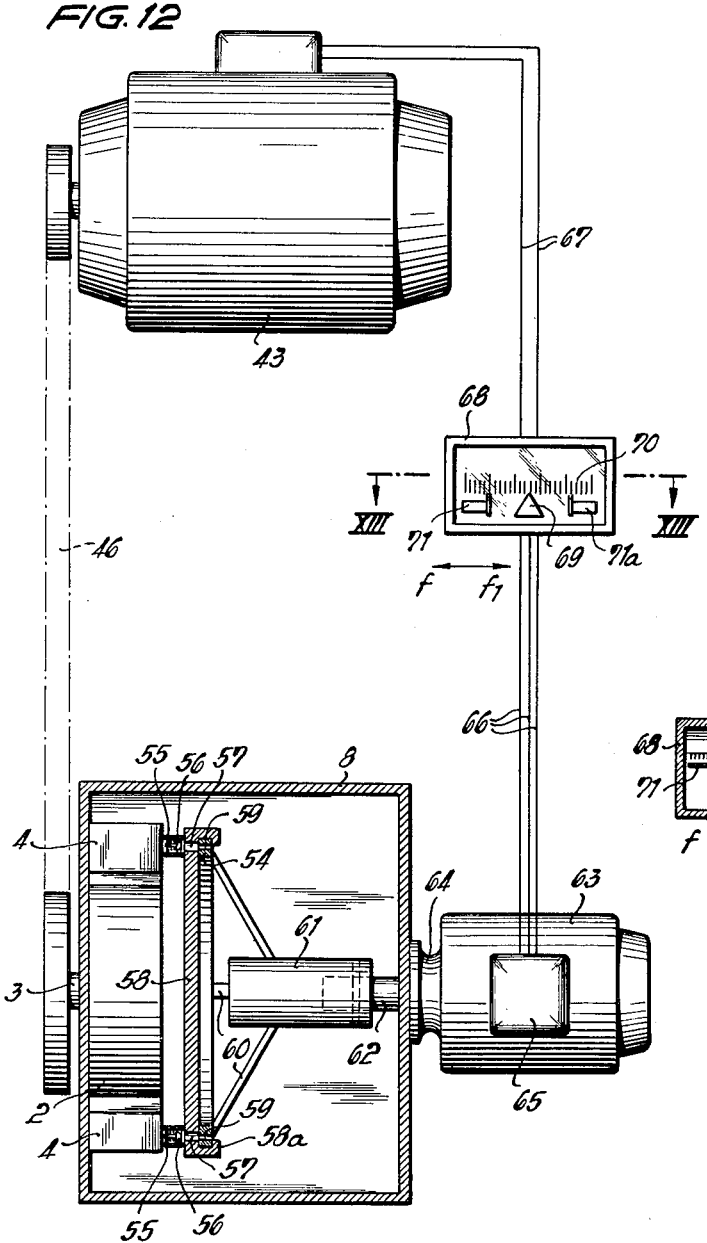

United States Patent Office
3,050,004
Patented Aug. 21, 1962

3,050,004
VALVE GEAR FOR FLUID PRESSURE PUMPS
Hans Friedrich Heintzmann, Bochum, Germany, assignor, by mesne assignments, to Bochumer Eisenhutte Heintzmann & Co., Bochum, Germany
Filed Mar. 15, 1957, Ser. No. 646,452
Claims priority, application Austria Mar. 19, 1956
21 Claims. (Cl. 103—37)

This invention concerns a valve gear for fluid pressure pumps and more particularly pressure pumps of the type in which pressure fluid is drawn in through an inlet provided with an inlet opening and a non-return valve and transferred to an outlet by the action of at least one piston moving with a constant stroke in a co-operating cylinder.

Pressure pumps of the type specified are used for the motivation of different types of machinery and are especially suitable for the motivation of presses, e.g. presses for the bending or straightening of section irons for gallery workings in mines. The pressure fluid, which is led from the pump to the cylinders of the machinery to be operated by the pump via a pressure conduit, usually flows back from such machinery via a further conduit into a reservoir from which the fluid is again drawn in by the pump via the said inlet thereof. In most cases, fluid pressure pumps of this type include a plurality of pistons and cylinders motivated from one common motor, each piston and cylinder drawing in pressure fluid from a common reservoir via separate inlets and conveying such fluid to a common outlet.

Known fluid pressure pumps of the type specified suffer from the disadvantage that at each piston stroke a constant amount of fluid is drawn in and conveyed into the outlet, this amount being independent of the amount of pressure fluid necessary for the motivation of the machinery to be operated by the pump, i.e. being independent of the fluid pressure prevailing at the outlet. Therefore, in such known pump an exceptionally large amount of pressure fluid corresponding to the greatest possible loading of the pump must be circulated by the pump and this leads to a considerable heating of the pressure fluid and provision must be made, e.g. by using a large reservoir and a large total quantity of fluid, to ensure cooling of the fluid. Since the output of pressure fluid at the highest rate of requirement must be brought up to the full fluid pressure, the consumption of energy for the motivation of these pumps is exceptionally high.

It is an object of this invention to overcome or reduce the above mentioned disadvantage, this object being achieved by providing, in a fluid pressure pump in which pressure fluid is drawn in through an inlet provided with an inlet opening and a non-return valve and transferred to an outlet by the action of at least one piston moving with a constant stroke in a co-operating cylinder, valve gear comprising a throttle valve of plate form and having an aperture therein; means for mounting the said valve in position superimposed over the said inlet opening with said aperture registering with the inlet opening so that fluid must pass through said aperture to enter the inlet; and means responsive to variations of loading of the pump for adjusting the throttle valve in a direction in the plane of the inlet opening in accordance with said variations of loading to move the said aperture relatively to the inlet opening thereby to vary the effective area of the latter between 5% and 100% of the actual area thereof. The or each piston working in its cylinder with constant piston stroke and substantially constant stroke counts draws in a smoothly adjustable amount of pressure fluid according to the adjustment of the throttle valve. At each suction stroke there is produced in the cylinder a vacuum inversely proportional to the amount of pressure fluid drawn in so that a smaller or greater part of the latter evaporates depending on the temperature prevailing in the pump cylinder and condenses again during the pressure stroke of the pump piston and is brought to the necessary fluid pressure on the last part of this pressure stroke.

Since, when using the valve gear of this invention, only that amount of pressure fluid which corresponds to the prevalent requirements of the machinery operated by the pump is brought to the necessary pressure, the energy consumption necessary for the motivation of the pump is very slight. The amount of energy necessary for the production of the vacuum in the pump cylinder, which is not very great, is, on the first part of the pressure stroke, in which a partial vacuum still prevails in the cylinder, largely made use of again for the movement of the piston. Thus, energy is only taken from the pump motor to serve the last part of the pressure stroke to give the necessary pressure to the amount of fluid drawn in by the pump. Since the amount of pressure fluid circulated by the pump is automatically and smoothly adjustable corresponding to the prevalent requirements of the machinery operated by the pump, the warming up of the pressure fluid is kept to a minimum.

The shape of the said throttle valve aperture should be chosen to permit a smooth adjustment of the effective area of the pump inlet between about 5% and 100% of the actual area thereof. Thus, even with the strongest throttling of the amount of pressure fluid drawn in by the pump, an effective area of about 5% of the actual inlet area is maintained in order to guarantee a sufficient lubrication of the pump cylinder.

A drop-shape or triangular-shape for the said throttle valve aperture has proved itself to be especially expedient. Such an aperture renders possible, in the range of small effective inlet areas, an especially sensitive variation of the amount drawn in through the inlet whilst, in the range of larger effective inlet areas, a small adjustment of the throttle valve effects a comparatively large variation of the amount drawn in through the inlet. The small width portion of the drop- or triangular-shaped aperture of the throttle valve is so arranged that, even with the strongest throttling, an effective area of about 5% of the actual inlet area is maintained. The length of the said throttle valve aperture in the direction of adjustment of the valve is preferably a multiple of the diameter of the inlet opening, whilst the greatest width of the aperture is desirably arranged to be substantially equal to the diameter of the inlet opening. In this way the advantage is achieved that a comparatively large range of adjustment of the throttle valve is available for the variation of the effective inlet area.

The throttle valve may be arranged to move rectilinearly in the plane of the inlet opening; it is, nevertheless, also possible to use for the throttle valve a rotary slide valve rotatable in the plane of the inlet opening.

In an advantageous embodiment of the invention, the automatic adjustment of the throttle valve is controlled by the fluid pressure in the outlet of the pump, variations in such fluid pressure causing movement of a biased, preferably spring biased, control piston which itself effects movement of the throttle valve. With such an arrangement, the characteristics of the biasing, e.g. a spring element, and the form of the throttle valve aperture may be so synchronised that, increase of fluid pressure in the pump outlet causes decrease of the amount of pressure fluid drawn in by the pump down to the minimum amount necessary for the lubrication of the cylinder, namely about 5% of the amount required to fill the cylinder. Thus a constant fluid pressure is maintained in the outlet leading to the machinery operated by the pump and, where such machinery is a bending press, for example, a constant pressure is exerted on the parts, e.g. section irons, to be bent. Since the fluid pressure prevailing in the outlet is dependent upon the prevailing use of pressure fluid by the machinery being operated by the pump, the output supplied by the pump adjusts itself automatically to the prevailing pressure fluid requirement of such machinery.

When using a spring element for the biasing of the said control piston, i.e. for the restoration of the throttle valve, it is especially advantageous to use a drop- or triangular-shaped throttle valve aperture having a form adapted to correspond with the hyperbolic force characteristics of a spring element, since, with such an arrangement, the adjustment of the effective area of the inlet opening of the pump is made independent of the actual value of pressure and the adjustment of the throttle valve is proportional to the variation of the pressure in the outlet over the whole range of such variation.

Preferably there is inserted between the said control piston and the throttle valve a manually operated clutch by which the position of the throttle valve can be adjusted independently of the position of the control piston, i.e. independently of the fluid pressure prevailing in the outlet.

According to a further feature of this invention, where a rotary motor is used as a motivator for the pump, automatic adjustment of the throttle valve may be controlled according to the moment of rotation required from the said motor to drive the pump. The said moment of rotation is, of course, dependent upon the loading of the pump and thus on the fluid pressure in the outlet. Preferably, in such case the throttle valve is mechanically coupled with a housing frame for said motor, which frame is pivotally mounted in a support, and adjustment of the valve is controlled by pivoting against an opposing force of the said frame in the plane of rotation of the motor armature under the action of the counter-moment transferred to this frame.

The said opposing force may be provided by a spring element or by a counter-weight, preferably acting at the circumference of the motor. The size and character of the opposing force, the coupling between the motor housing frame and the throttle valve, as well as the construction of the valve aperture, may be synchronised with one another in any desired manner. A preferred arrangement is such that the amount of pressure fluid is reduced down to the minimum requirement of 5% of the amount required to fill the cylinder when the highest permissible counter-moment is reached. On a reduction of the energy requirement of the machine and a corresponding reduction of the counter-moment transferred to the motor housing frame occurring, the effective area of the inlet opening becomes enlarged by the opposed adjustment of the throttle valve until the counter-moment transferred to the motor housing frame becomes equal to the opposing force. In this way it is possible, in spite of different pressure fluid requirements by the machinery operated by the pump, to maintain the turning moment demanded from the pump motor substantially constant—apart from slight fluctuations—so that harmful loadings of the pump motor are avoided.

In another embodiment, the automatic adjustment of the throttle valve is controlled according to the input of the pump motor and preferably by a reversible control motor which is automatically switched on or off and reversed by a power meter according to the prevailing input of the pump motor.

In fluid pressure pumps of the kind for which valve gear according to this invention is primarily designed and in which are provided a plurality of pistons and co-operating cylinders each having an independent inlet communicating with a common reservoir, conveniently the said inlets all have their inlet openings in the same plane and a common throttle valve is provided for said inlets, the said valve being formed by a flat plate superimposed over the said inlet openings and having a different aperture registering with each inlet opening, each of said apertures being of a greater length in the direction of adjustment of the throttle valve than the width of the corresponding inlet opening in this direction, and preferably being drop- or triangular-shaped, adjustment of the throttle valve causing simultaneous adjustment of the effective area of all the inlet openings, preferably to the same degree. With this arrangement, the amount of pressure fluid conveyed to the outlet can be regulated manually or automatically in a simple manner by means of a single, exceptionally simply constructed, throttle valve, even in multi-cylinder fluid pressure pumps, automatic adjustment of the throttle valve being controlled according to the loading of the pump, i.e. according to the fluid pressure prevailing in the outlet, the turning moment required from the pump motor, or the input of the pump motor.

Several embodiments of the invention are illustrated by way of example in the drawings in which:

FIGURE 1 is a schematic side elevation of one embodiment of fluid pressure pump incorporating valve gear according to this invention, the said pump being shown with the side wall of the reservoir housing omitted;

FIGURE 2 is a front elevation of the fluid pressure pump of FIGURE 1 on a larger scale and with the reservoir housing omitted;

FIGURE 3 is a side elevation of the valve gear of the pump of FIGURES 1 and 2;

FIGURE 4 is a rear elevation of a modification of the valve gear of FIGURE 3;

FIGURE 7 is a front elevation of a third embodiment of fluid pressure pump having valve gear according to this invention, said pump being shown with the reservoir housing omitted;

FIGURE 8 is a section on the line VIII—VIII of FIGURE 7;

FIGURE 9 is a side elevation on a smaller scale of the fluid pressure pump of FIGURE 7, the pump being shown with the side wall of the reservoir housing omitted;

FIGURE 10 is a front elevation of another embodiment of fluid pressure pump having valve gear according to this invention;

FIGURE 11 is a side elevation of the pump motor of the embodiment of FIGURE 10;

FIGURE 12 is a schematic representation of a further embodiment of fluid pressure pump having valve gear according to this invention; and FIGURE 13 is a section on the line XIII—XIII of FIGURE 12.

Figure 5:
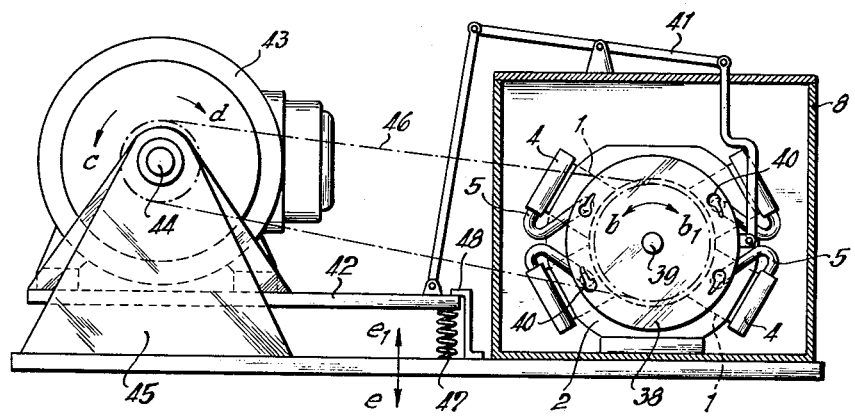
FIGURE 5 is a schematic front elevation of a second embodiment of fluid pressure pump having valve gear according to this invention.

In the pumps of all the embodiments illustrated in the drawings, see particularly FIGURES 1, 2, 5, 7, 9 and 10, four pump cylinders 1 are arranged in a housing frame 2 in angularly spaced positions around an eccentric, not shown, which is motivated by a pump shaft 3. In each pump cylinder 1 is arranged a piston, not shown, the pistons being flexibly connected with guide shoes on the eccentric, which guide shoes guide a box securely fixed onto, and freely rotatable about, the said eccentric. The pump pistons are moved axially in and out of the cylinders 1 with constant stroke count and constant piston stroke by the turning of the eccentric which is caused to revolve at a constant speed.

At the outer end of each pump cylinder 1 is provided a cylinder head 4 in which open the suction and pressure pipes of the pump cylinder, the four cylinder heads 4 being arranged to be coplanar.

In the embodiment illustrated in FIGURES 1, 2 and 3, and modification illustrated in FIGURE 4, the cylinder heads 4 are connected via short inlet pipes 5, which are provided with non-return valves 6, to a common throttle valve 7. The housing frame 2, inlet pipes 5 and throttle valve 7 are arranged in a closed housing 8 which serves as a reservoir for the pressure fluid. As will be seen from FIGURE 1, the throttle valve 7 is arranged over the ends of the inlet pipes 5 opening into the reservoir 8 and the pipes 5 are led to this position along short longitudinal sections which are parallel to one another and closely spaced. The length of each suction pipe 5 is only slightly greater than the distance of the cylinder heads 4 from the pump shaft 3.

On the suction stroke of the pump pistons, the pressure fluid, which is preferably oil, is drawn into the cylinders 1 directly from the closed housing 8, which is substantially filled with the pressure fluid, via the non-return valves 6, the inlet pipes 5 and the throttle valve 7. On the pressure stroke of the pump pistons, the pressure fluid from the cylinder 1 is pumped to a chamber 11 via pressure valves 9 and short connecting pipes 10 separated from one another. A common outlet pipe 12 for all the pump cylinders 1 leads from the chamber 11 to the working cylinder or cylinders of the machinery, e.g. a bending press, not shown, to be operated by the pump. The pressure fluid from the working cylinder or cylinders of this machinery returns, via a schematically illustrated return pipe 13, to within the closed reservoir housing 8. Furthermore, an excess pressure valve 14 is provided in the outlet pipe 12 which, when an adjustable maximum pressure in the outlet pipe 12 is reached, allows the pressure fluid to flow back directly into the reservoir housing 8. The excess pressure valve 14 is provided to prevent inadmissible increases in pressure in the outlet pipe 12 which could occur during long periods of inactivity of the working machinery and pump as a result of the limited throttling of the amount drawn in through the pump inlets to about 5% of the complete cylinder capacity.

The throttle valve 7 consists, in the embodiment illustrated in FIGURES 1 to 3, and in the modification illustrated in FIGURE 4, of a forked plate 15 which is firmly guided between a support element 16 for the inlet pipes 5 and guiding edges 17 connected to such element so that the plate 15 is displaceable in the direction X—$X_1$. An angle piece 18 is fixed onto the support element 16 and has in an upper part a borehole 19 in which is displaceably guided a bolt 20 rigidly coupled with the plate 15 so far as the direction of movement X—$X_1$ is concerned. The adjustability of the plate 15 in the direction X—$X_1$ is limited by stops 18a and 17a provided respectively by the lower surface of the upper part of the angle piece 18 and the upper parts of the guide edges 17.

Parallel threaded bores 21 are provided in the support element 16 and the ends of the inlet pipes 15 are screwed into these bores 21. Further bores 22 extend from the threaded bores 21 through to the other side of the support element 16, each of said bores 22 having a cross-sectional area corresponding to the cross-sectional area of the inlet pipes 5. Somewhat drop-shaped apertures 23 are provided in both limbs of the plate 15 so as to extend in the direction of movement X—$X_1$ of the plate. The apertures 23 register with the openings at which the bores 22 emerge from the support element 16 and which form inlet openings for the pump. The greatest length of the apertures 23 corresponds to a multiple of the diameter of the bores 22 or of the inlet pipes 5. The form of the apertures 23 is so chosen that the inlet openings are throttled down to about 5% of the cross-sectional area of the inlet pipes 5 by the lowest position of the plate 15. In the upper end-position of the plate 15, the full cross-sectional area of the inlet pipes 5 is opened by the lower, somewhat arc-shaped, sections of the apertures 23. Between these two limiting values the amount of pressure fluid drawn in by the pump pistons at each stroke can be smoothly regulated by adjustment of the throttle valve in the direction X—$X_1$.

In the embodiment illustrated in FIGURES 1, 2 and 3, the bolt 20 is extended as a piston rod 20a which is securely fixed to a guide piston 24. The guide piston 24 is tightly guided axially in a guide cylinder 25 which is secured into the outer wall of the outlet pipe 12 via a connecting pipe 26. The guide piston 24 is impinged upon on one side by the pressure fluid with the pressure prevailing in the outlet pipe 12. The movement of the piston 24 in the direction $X_1$ is opposed by a pressure spring 27 placed around the piston rod 20a and supported between opposed end faces of the guide cylinder 25 and of the piston 24. The throttle valve plate 15 is thus moved, according to the fluid pressure prevailing in the outlet pipe 12, against the action of the spring 27 in such a manner that the effective area of the inlet openings leading to the inlet pipes 5 is reduced by an increase of the outlet fluid pressure and increased with a reduction of the outlet fluid pressure.

In the modification illustrated in FIGURE 4, a manually operated clutch is inserted between the guide piston 24 and throttle valve plate 15, such clutch enabling the position of the plate 15 to be adjusted independently of the position of the guide piston 24. The free end of the piston rod 24a is formed as a longitudinally extending loop 24b in which the end-section 20b of the coupling bolt 20 is displaceably guided under the action of a pressure spring 29 opposing movement in the direction $X_1$. The end-section 20b of the bolt 20 is provided with a transverse bolt 28 and the outer ends of the latter are guided in longitudinal slots 30 in the forked end of an angle lever 31, which is mounted for pivotal movement about a pivot mounted securely in the reservoir housing 8. In the position illustrated in FIGURE 4 the end-section 20b of the bolt 20 carrying the transverse bolt 28 is held by the pressure spring 29 in the end position in which it is limited by the upper end face of the loop 24b. A displacement of the guide piston 24 conditioned by alteration of the pressure conditions in the outlet pipe 12 thus operates directly on the throttle valve plate 15. By pivoting the angle lever 31 in the direction y, the bolt 20, and with it the valve plate 15, is displaced against the action of the pressure spring 29 in the direction $X_1$ by the transverse bolts 28 in the longitudinal slots 30 without the position of the guide piston 24 being thereby altered. By the use of the said clutch, an additional throttling of the amount of pressure fluid drawn in through the inlet openings may be achieved independently of the pressure in the outlet pipe 12. This may be of advantage, for example, where one wishes to have an especially sensitive setting of the machinery operated by the pump, as, for example, in the pressing of thin sheets of metal in a bending press.

In the embodiment illustrated in FIGURES 7 to 9, the outwardly directed cylinder heads 4 of the pump cylinders 1 are provided with short inlet pipes 32 arranged substantially perpendicularly to the plane of the pump cylinders 1. As can be seen from FIGURE 8, spring loaded non-return valves are provided in the inlet pipes 32 and the latter extend into the interior of, and open into, the pump cylinders 1. The inlet pipes 32 provide inlet openings 32a, the effective area of which can be adjusted by a rotary slide valve 34 arranged parallel to, and only a very small distance from, the plane of the pump cylinders 1 and provided with drop- or triangular-shaped apertures 35 extending longitudinally in the direction of rotation so that the effective areas of the inlet openings may be varied between 5% and 100% of the actual area thereof. The inlet pipes 32 of the pump cylinders 1 are arranged on a circle concentric with the motivating shaft 3 for the pump pistons. The rotary slide valve 34 is formed by an annular segment of small radial width which is displaceably guided on both sides in the region of the inlet pipes 32 in a sliding guide 36, 36a in the turning direction Z—$Z_1$. In this case, the rotary slide valve 34 is also arranged fluid tightly against the guides 36, 36a so that the pressure fluid drawn in by the pump pistons can only enter into the inlet pipes 32 via the apertures 35.

As can be seen from FIGURE 9, the pump cylinders 1, as well as the rotary slide valve 34, are arranged in a closed reservoir housing 8 which is always filled with pressure fluid to a level above the upper inlet pipes 32. Therefore, the pump pistons draw in the pressure fluid directly from the reservoir housing 8 via the inlet pipes 32 and the apertures 35. Also in this embodiment the pump cylinders convey pressure fluid via connecting pipes 10 provided with pressure valves 9 into a common chamber 11 from which leads a common outlet pipe 12. A guide cylinder 25 is connected to the outlet pipe 12 via a short connecting pipe 26 in which a guide piston 24 is tightly guided in an axial direction. The piston rod 24a of the guide piston 24 is displaceable in the direction $a$—$a_1$ and is flexibly fixed to a lug on the rotary slide valve 34. Displacement of the guide piston 24 in the direction $a$ gives rise to a turning of the rotary slide valve 34 in the direction Z and a reduction of the effective areas of the inlet openings, whilst a displacement of the guide piston 24 in the direction $a_1$ causes the rotary slide valve to be turned in the direction $Z_1$ and the effective areas of the inlet openings to be increased. The adjustment of the effective area of each inlet opening is the same for all pump cylinders 1. The necessary coupling between the piston rod 24a and the lug 37 may conveniently be achieved by a bolt which is guided in a longitudinal slot arranged radially to the rotary slide valve 34.

Figure 6:
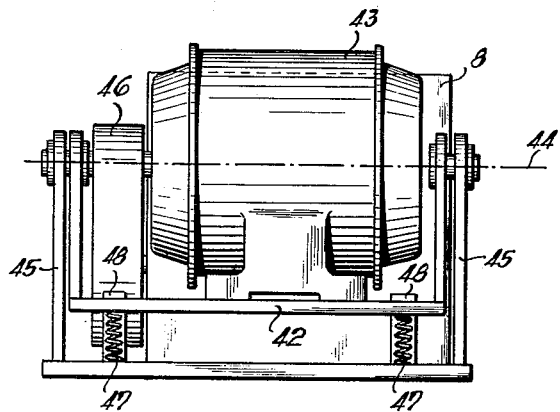
FIGURE 6 is a side elevation of the pump motor of the embodiment of FIGURE 5.

In the embodiment illustrated in FIGURES 5 and 6, the throttle valve is formed as a rotary slide valve 38 which is mounted for rotation about an axis 39 in the direction $b$—$b_1$. Four drop-shaped openings 40 are provided in the rotary slide valve 38 and such openings extend longitudinally in the direction of rotation. Rotation of the slide valve 38 causes continuous increase or decrease of the effective areas of the inlet openings provided by the open ends of the inlet pipes 5 which are arranged parallel to one another. The rotary slide valve 38 is mechanically coupled with the bed plate 42 of a pump motivator 43 which is formed as an electric motor, such coupling being made via a jointed lever rod 41. The housing frame of the pump motor 43 is securely connected with the bed plate 42 and is mounted in a trestle 45 with the bed plate for pivoting about the axis 44 of the motor armature. The armature of the pump motor 43, which is rotatable in the direction $c$, drives, via a belt or chain drive, for example, the eccentric which is carried by the shaft 3 and which motivates the piston movements of the pump cylinders 1. The turning axis 44 is arranged perpendicularly to the plane of rotation of the motor armature. As a result of the counter-moment transferred to the motor housing frame in the direction $d$, the bed plate 42, which is securely attached to the housing frame, experiences a swing in the direction $e$ against the action of the pressure spring 47, and causes rotation of the rotary slide valve 38 in the direction $b$. In this way the effective areas of the inlet openings are reduced so that a reduction of the amount of pressure fluid drawn in by the pump results. The counter-moment is proportional to the moment of rotation required from the pump motor and the larger the counter-moment carried over to the motor housing frame and acting in the direction $d$ the stronger is the throttling of the amount of pressure fluid drawn into the pump cylinders 1. The extent of pivoting of the bed plate 42 in the direction $e_1$ is limited by stops 48 so that during idle running of the pump motor 43, i.e. when there is only a very small loading of the spring element 47 by a counter-moment transferred to the motor housing frame, the drop-shaped apertures 40 of the rotary slide valve 38 uncover the full areas of the inlet openings. Of course, in the embodiment illustrated in FIGURES 5 and 6, the cylinder heads 4 are connected via connecting pipes 10 of comparatively short length and a chamber 11 to a common outlet pipe 12.

In the embodiment illustrated in FIGURES 10 and 11, the adjustment of the rotary slide valve 34 which is formed as an annular segment is also controlled according to the moment of rotation required from the pump motor 43. The motor housing frame, in this embodiment, is also mounted for pivoting about an axis 44 in a trestle 45, i.e. in the plane of rotation of the motor armature. A counter-moment acting in the direction $d$ is exerted on the motor housing frame by the motor armature revolving in the direction of rotation $c$, and this counter-moment tends to pivot the motor housing frame and also the bed plate 42 securely attached thereto. This pivoting movement acts against a counter-weight 50 flexibly attached to the circumference of the motor housing frame by means of a lever 49. The counter-weight 50 is formed as a piston and is guided in a longitudinally displaceable manner and with little play in a shock absorbing cylinder which is preferably filled with oil. In this arrangement, the counter-weight 50 acts as a shock absorber which prevents a repeated to and fro oscillation of the motor housing frame which might arise as a result of large changes in the moment of rotation required from the pump motor. The counter-weight 50 also ensures that the motor frame housing will pivot to the position corresponding to this moment of rotation. As in the embodiment illustrated in FIGURES 5 and 6, the motivation of the pump pistons is derived via a chain- or belt-drive 46 which does not hinder the pivoting of the motor housing frame in the direction $e$—$e_1$ around the turning axis 44.

The rotary slide valve 34 is mechanically coupled with the motor housing frame by a lever 52 linked to the circumference of the motor housing frame and to the rotary slide valve 34. Pivoting of the motor housing frame in the direction $e$—$e_1$ produces as a result a corresponding turning of the rotary slide valve in the direction $Z_1$—$Z$. The rotary slide valve 34 is formed in the shape of an annular segment and has four apertures 53 which are elongated in the direction of rotation of the slide valve 34 but which, nevertheless, in contradistinction to the apertures of the previously discussed embodiment, are somewhat rectangular in shape. Each of the apertures 53 registers with one of the inlet openings provided by the inlet pipes 32 of the pump cylinders. The inlet pipes may be of the same form as those of the embodiment described with reference to FIGURE 8. The rotary slide valve 34 possesses a similar form to that of the embodiment illustrated in FIGURES 7 to 9 and is displaceably guided in the direction $Z$—$Z_1$ in the slide guides 36a coordinated with the individual inlet pipes. Also in the embodiment illustrated in FIGURES 10 and 11, the pump cylinder 1 conveys pressure fluid, via connecting pipes 10 provided with pressure valves, into a chamber 11 and from there into a common outlet pipe 12 which is provided with an excess pressure valve 14. The pump cylinder 1 and the throttle valve 34 including the inlet pipes and the connecting pipes 10 are also arranged, as in the case of the embodiments illustrated in FIGURES 1 and 2 or 7 to 9, in a completely closed reservoir housing 8, which is permanently filled with pressure fluid to a level above the upper inlet pipe.

If the moment of rotation required of the pump motor increases, for example, when the pump piston is required to work against an increased pressure in the outlet pipe, the motor housing frame and the flexible levers 49 and 52 fixed to its circumference, are pivoted in the direction $e$ by the counter-moment transferred to the motor housing frame in the direction $d$, the counter-weight 50 of the circumference of the housing frame acting in the opposed direction of rotation $c$ and against this pivoting. The reverse turning moment carried over to the motor housing frame by the counter-weight 50 remains practically constant over the whole range of pivoting movement of the motor housing frame as a result of the small path of pivoting movement in this case. The pivoting of the motor housing frame in the direction $e$—$e_1$ and thereby effected displacement of the rotary slide valve 34 in the direction $Z$—$Z_1$ is substantially proportional to the alteration of the turning moment required of the pump motor 43. Since, in contradistinction to the embodiment illustrated in FIGURES 5 and 6, the opposing force acting on the circumference of the motor housing frame remains constant over the whole range of pivoting movement, the apertures 53 may have any shape elongated in the direction of rotation of the valve 34. Nevertheless, a drop- or triangular-shaped form is also particularly advantageous in this case. As a result of pivoting of the rotary slide valve 34 in the direction $Z_1$, the amount of pressure fluid drawn in by the pump pistons is throttled until the turning moment required of the pump motor decreases to the normal working turning moment. On the other hand, when the turning moment required of the pump motor falls below the normal amount, the effective area of the inlet openings, and consequently the amount of pressure fluid drawn in through such openings is increased until the normal turning moment of the pump motor is again reached.

In contradistinction to the embodiment illustrated in FIGURES 10 and 11, the counter-weight 50 can also be connected with the housing frame of the pump motor 43 in such a manner that the counter-weight 50 engages with an exactly equally large lever arm on the circumference of the motor housing frame at each position of the motor housing frame. This has the advantage that an equally large reverse turning moment acts against the counter-moment transferred to the motor housing frame.

In the embodiment illustrated in FIGURES 12 and 13, the throttle valve 54 which is formed as a rotary slide valve is controlled in dependence of the input of the pump motor 43. The fluid pressure pump, which consists, as before, of four angularly spaced pump cylinders, is, together with the throttle valve 54, disposed in a closed reservoir housing 8 which is substantially filled with pressure fluid. Short inlet pipes 55 are connected to the cylinder-heads 4 of the pump cylinders and are arranged perpendicularly to the plane of the pump cylinders, valves 56 being arranged in these inlet pipes 55. The inlet pipes 55 open into bores 57 through a circular-shaped guide plate 58 for the rotary slide valve 54, the guide plate 58 being provided, in the region of the inlet pipes 55, with guide lugs, having a U-shaped cross-sectional form, for the rotary slide valve 54. An aperture 59, which is elongated in the direction of rotation and is drop-or triangular-shaped, is provided in the rotary slide valve 54 in register with each inlet opening provided by the inlet pipes 57, 55. Displacement of the rotary slide valve causes the apertures 59 to uncover a continuously increasing or decreasing part of the areas of the inlet openings with the range of 5%–100% of such areas.

The rotary slide valve 54 is securely fixed to a box 61 by stays 60, the box 61 being rigidly connected on its side in the direction of rotation with the driving shaft 62 of a powerful reduction gear 64 motivated by an electric control motor 63. The electric control motor 63 can be operated with changing direction of rotation and can be switched in and out of circuit, as well as reversed, by means of a switch relay 65. The actuation of the switch relay 65 is controlled via leads 66—only schematically illustrated in the drawing—from a power meter 68 connected to the pump motor 43 via leads 67. The power meter, illustrated for the sake of example as a watt meter, indicates on a scale 70, by means of a pointer 69, the prevailing input of the electric pump motor 43. Hunting contacts 71, 71a are provided on the scale 70 of the output meter 68 on both sides of the position representing normal output, i.e. the normal continuous loading of the pump motor 43, and each contact is in permanent contact with the switch relay 65 via one of the leads 66. The pointer 69, which is provided with a slide-contact 69a, is permanently connected with the switch relay 65 over a third one of the leads 66. The distance of the hunting contacts 71, 71a from the position indicating the normal continuous loading of the pump motor 43 can, for example, amount to about 5% of such normal continuous loading. The hunting contacts 71, 71a are expediently displaceably arranged on the scale 70 so that the output range fixed by these contacts can be altered as desired. Instead of a watt meter an ammeter could be used, if desired, with an alternating current motor or a three-phase current motor since, as a result of the practically constant voltage used with motors of this type during working, the output is proportional to the current consumption.

If the output of the pump motor 43 sinks below the normal continual working load, the pointer 69 of the power meter 68 moves in the direction $f$ until it closes an electric circuit within the switch relay 65 by its slide contact 69a reaching the hunting contact 71. The switch relay 65 then switches in the control motor 63 with a direction of rotation such that the turning slide valve 54 is turned, via the reduction gear 64, in such a way that the effective areas of the inlet openings of the inlet pipes 55, 57 are increased. The amount of pressure fluid drawn in by the pump cylinders is increased by this means until the output of the pump motor 4 increases and the electric circuit is closed by touching of the contacts 71, 69a, whereupon the control motor 63 is again switched out by the switch relay 65. If the output of the pump motor 43 increases above the normal continuous loading, the pointer 69 moves in the direction $f_1$ until it closes another electric circuit within the switch relay 65 by touching of the slide contact 69a with the hunting contact 71a. In this way the control motor 63 is switched on with an opposed direction of rotation so that the rotary slide valve 54 is turned so as to reduce the effective areas of the inlet openings of the pump cylinders, i.e. to produce a throttling of the amount of pressure fluid drawn in by the latter. In order to render possible a sensitive adjustment of the rotary slide valve 54, an especially large reduction ratio, such as, for example, 20,000:1, of the gear 64 must be chosen.

The control of the control motor 63 in dependence of the output of the pump motor 43 can also be achieved in other ways than that described in connection with the embodiment illustrated in FIGURES 12 and 13. For example, it is possible, instead of the hunting contacts 71, 71a, to use beams of light issuing from a transmitter and directed towards a photo-cell and which are interrupted by a corresponding deflection of the output pointer 69. In this latter case a connection can be chosen such that the control motor 43 is switched on with the necessary direction of rotation by an interruption of a light beam provided on both sides of the position representing normal load via a switch relay and corresponding amplifier. As soon as the pointer 69 again uncovers the interrupted beam of light, the control motor then automatically cuts itself out, possibly after an adjustable period of time.

I claim:

1. In a hydraulic pressure pump assembly the improvement comprising in combination
    (a) a plurality of pump cylinders;
    (b) a piston reciprocating in each cylinder with constant stroke;
    (c) a rotatably mounted pump shaft actuating said pistons;
    (d) a suction piping attached to each pump cylinder;
    (e) a check valve in each suction piping;
    (f) a pressure piping common to all pump cylinders;
    (g) adjustable throttle means controlling said suction pipings;
    (h) a motor having rated torque and power input characteristics and including a rotatable shaft drivingly connected to said pump shaft;
    (i) means directly responsive to variations of at least one of said characteristics of the motor;
    (j) and adjusting means for the throttle means operatively connecting the same and said responsive means thus that the effective passage of the throttle means is reduced when one of said characteristics increases and is enlarged when one of said characteristics decreases thereby preventing at least substantial variations of said characteristics resulting from changes of the motor load.

2. In a hydraulic pressure pump assembly the improvement comprising in combination
(a) a plurality of pump cylinders;
(b) a piston reciprocating in each cylinder with constant stroke;
(c) a rotatably mounted pump shaft actuating said pistons;
(d) a suction piping attached to each pump cyinder;
(e) a check valve in each suction piping;
(f) a pressure piping common to all pump cylinders;
(g) adjustable throttle means controlling said suction pipings;
(h) a motor drivingly connected to said pump shaft and including a motor frame and a rotatably mounted motor shaft;
(i) supporting means holding said motor frame tiltably about the axis of the motor shaft;
(j) damping means associated with said tiltable motor frame to absorb torsional reaction moments arising therein in response to any change of the torque of the motor shaft resulting from a change of the motor load;
(k) and adjusting means for the throttle means operatively connecting the same and said tiltable motor frame thus that the effective passage of the throttle means is reduced with increasing motor load and is enlarged with decreasing motor load to prevent at least substantial variations of the load on the motor.

3. In a hydraulic pressure pump assembly the improvement comprising in combination
(a) a plurality of pump cylinders;
(b) a piston reciprocating in each cylinder with constant stroke;
(c) a rotatably mounted pump shaft actuating said pistons;
(d) a suction piping attached to each pump cylinder;
(e) a check valve in each suction piping;
(f) a pressure piping common to all pump cylinders;
(g) adjustable throttle means controlling said suction pipings;
(h) a motor drivingly connected to said pump shaft and including a stator and a rotor;
(i) supporting means holding said stator tiltably about the rotational axis of the rotor;
(j) damping means associated with said tiltable stator to absorb torsional reaction moments arising therein in response to any change of the torque of the rotor resulting from a change of the motor load;
(k) and adjusting means for the throttle means operatively connecting the same and said tiltable stator thus that the effective passage of the throttle means is reduced with increasing motor load and is enlarged with decreasing motor load to prevent at least substantial variations of the load on the motor.

4. In a hydraulic pressure pump assembly the improvement comprising in combination
(a) a plurality of pump cylinders;
(b) a piston reciprocating in each cylinder with constant stroke;
(c) a rotatably mounted pump shaft actuating said pistons;
(d) a suction piping attached to each pump cylinder;
(e) a check valve in each suction piping;
(f) a pressure piping common to all pump cylinders;
(g) adjustable throttle means controlling said suction pipings;
(h) a motor drivingly connected to said pump shaft and including a motor frame and a rotatably mounted motor shaft;
(i) a base plate integral with the motor frame;
(j) supporting means holding said base plate tiltably about the axis of the motor shaft;
(k) damping means associated with said tiltable base plate to absorb reaction moments arising therein in response to any change of the torque of the motor shaft resulting from a change of the motor load;
(l) and adjusting means for the throttle means operatively connecting the same and said tiltable base plate-motor frame unit so that the effective passage of the throttle means is reduced with increasing motor load and is enlarged with decreasing motor load to prevent at least substantial variations of the load on the motor.

5. In a hydraulic pressure pump assembly the improvement comprising in combination
(a) a plurality of pump cylinders;
(b) a piston reciprocating in each cylinder with constant stroke,
(c) a rotatably mounted pump shaft actuating said pistons;
(d) a suction piping attached to each pump cylinder;
(e) a check valve in each suction piping;
(f) a pressure piping common to all pump cylinders;
(g) adjustable throttle means controlling said suction pipings;
(h) a motor drivingly connected to said pump shaft and including a stator and a rotor;
(i) a base plate integral with the stator;
(j) supporting means holding said base plate tiltably about the rotational axis of the rotor;
(k) transmission means between said rotor and said pump shaft;
(l) damping means associated with said tiltable base plate to absorb reaction moments arising therein in response to any change of the motor load;
(m) and adjusting means for the throttle means operatively connecting the same and said tiltable base plate-stator unit so that the effective passage of the throttle means is reduced with increasing motor load and is enlarged with decreasing motor load to prevent at least substantial variations of the load on the motor.

6. A hydraulic pressure pump assembly according to claim 2 wherein the damping means consist of at least one balance weight eccentrically associated with the tiltable motor frame.

7. A hydraulic pressure pump assembly according to claim 3 wherein the damping means consist of at least one balance weight eccentrically associated with the tiltable stator.

8. A hydraulic pressure pump assembly according to claim 4 wherein the damping means consist of at least one balance weight eccentrically associated with the tiltable base plate-motor frame unit.

9. A hydraulic pressure pump assembly according to claim 5 wherein the damping means consist of at least one balance weight eccentrically associated with the tiltable base plate-stator unit.

10. A hydraulic pressure pump assembly according to claim 6 comprising a shock absorber cylinder reciprocably housing said balance weight.

11. A hydraulic pressure pump assembly according to claim 7 comprising a shock absorber cylinder reciprocably housing said balance weight.

12. A hydraulic pressure pump assembly according to claim 8 comprising a shock absorber cylinder reciprocably housing said balance weight.

13. A hydraulic pressure pump assembly according to claim 9 comprising a shock absorber cylinder reciprocably housing said balance weight.

14. A hydraulic pressure pump assembly according to claim 2 wherein the damping means consist of a spring attached with one end eccentrically to the tiltable motor frame and with its other end to a stationary element of the assembly.

15. A hydraulic pressure pump assembly according to claim 3 wherein the damping means consist of a spring attached with one end eccentrically to the tiltable stator and with its other end to a stationary element of the assembly.

16. A hydraulic pressure pump assembly according to claim 4 wherein the damping means consist of a spring attached with one end eccentrically to the tiltable base plate-motor frame unit and with its other end to a stationary element of the assembly.

17. A hydraulic pressure pump assembly according to claim 5 wherein the damping means consist of a spring attached with one end eccentrically to the tiltable base plate-stator unit and with its other end to a stationary element of the assembly.

18. In a hydraulic pressure pump assembly the improvement comprising in combination
 (a) a plurality of pump cylinders;
 (b) a piston reciprocating in each cylinder with constant stroke;
 (c) a rotatably mounted pump shaft actuating said pistons;
 (d) a suction piping attached to each pump cylinder;
 (e) a check valve in each suction piping;
 (f) a pressure piping common to all pump cylinders;
 (g) adjustable throttle means controlling said suction piping;
 (h) a motor drivingly connected to said pump shaft and including a motor frame and a rotatably mounted motor shaft;
 (i) supporting means holding said motor frame tiltably about the axis of the motor shaft and thus permitting said frame to reactively tilt in response to any change of the torque of the motor shaft resulting from a change of the motor load;
 (j) and adjusting means for the throttle means operatively connecting the same and the tiltable motor frame so that the effective passage of the throttle means is reduced with increasing motor load and is enlarged with decreasing motor load to prevent at least substantial variations of the load on the motor.

19. In a hydraulic pressure pump assembly the improvement comprising in combination
 (a) a plurality of pump cylinders;
 (b) a piston reciprocating in each cylinder with constant stroke;
 (c) a rotatably mounted pump shaft actuating said pistons;
 (d) a suction piping attached to each pump cylinder;
 (e) a check valve in each suction piping;
 (f) a pressure piping common to all pump cylinders;
 (g) adjustable throttle means controlling said suction pipings;
 (h) a motor drivingly connected to said pump shaft and including a stator and a rotor;
 (i) supporting means holding said stator tiltably about the rotational axis of the rotor and thus permitting said frame to reactively tilt in response to any change of the torque of the rotor resulting from a change of the motor load;
 (j) and adjusting means for the throttle means operatively connecting the same and the tiltable stator thus that the effective passage of the throttle means is reduced with increasing motor load and is enlarged with decreasing motor load to prevent at least substantial variations of the load on the motor.

20. In a hydraulic pressure pump assembly the improvement comprising in combination
 (a) a plurality of pump cylinders;
 (b) a piston reciprocating in each cylinder with constant stroke;
 (c) a rotatably mounted pump shaft actuating said pistons;
 (d) a suction piping attached to each pump cylinder;
 (e) a check valve in each suction piping;
 (f) a pressure piping common to all pump cylinders;
 (g) adjustable throttle means controlling said suction pipings;
 (h) an electric motor driving said pump shaft;
 (i) electric measuring means responsive to the power input of said electric motor;
 (j) power operated adjusting means for said throttle means operatively connecting the same and said responsive electric measuring means thus that the effective passage of the throttle means is reduced with increasing power input of said electric motor and is enlarged with decreasing power intake to prevent at least substantial variations of such power input.

21. In a hydraulic pressure pump assembly the improvement comprising in combination
 (a) a plurality of pump cylinders;
 (b) a piston reciprocating in each cylinder with constant stroke;
 (c) a rotatably mounted pump shaft actuating said pistons;
 (d) a suction piping attached to each pump cylinder;
 (e) a check valve in each suction piping;
 (f) a pressure piping common to all pump cylinders;
 (g) adjustable throttle means controlling said suction pipings;
 (h) an electric pump motor driving said pump shaft;
 (i) a reversible electric adjusting motor actuating said throttle means;
 (j) a watt meter indicating the power input of said pump motor;
 (k) electric conduits between said watt meter and said adjusting motor to automatically switch on and off and reverse, respectively, the latter in such manner that the effective passage of the throttle means is reduced with increasing power input of the pump motor and is enlarged with decreasing power input to keep the same substantially constant.

References Cited in the file of this patent

UNITED STATES PATENTS

| | | |
|---|---|---|
| 1,252,756 | Wilcox | Jan. 8, 1918 |
| 1,783,036 | Crawford | Nov. 25, 1930 |
| 1,855,032 | Sinclair | Apr. 19, 1932 |
| 1,988,296 | Blume et al. | Jan. 15, 1935 |
| 1,990,263 | Benedek | Feb. 5, 1935 |
| 2,010,165 | Tear | Aug. 6, 1935 |
| 2,033,920 | Centervall | Mar. 17, 1936 |
| 2,193,118 | Thoma | Mar. 12, 1940 |
| 2,433,220 | Huber | Dec. 23, 1947 |
| 2,571,374 | Mayr | Oct. 16, 1951 |
| 2,691,388 | Livers | Oct. 12, 1954 |
| 2,823,872 | Dourdeville | Feb. 18, 1958 |
| 2,867,175 | West | Jan. 6, 1959 |

FOREIGN PATENTS

| | | |
|---|---|---|
| 101,783 | Australia | May 20, 1955 |
| 808,811 | France | Nov. 24, 1936 |
| 975,094 | France | Oct. 11, 1950 |